Patented Mar. 8, 1938

2,110,412

UNITED STATES PATENT OFFICE 2,110,412

PROCESS FOR TREATING MERCAPTAN SOLUTIONS

David Louis Yabroff and John Wilkinson Givens, Berkeley, Calif., assignors to Shell Development Company, San Francisco, Calif., a corporation of Delaware No Drawing. Application August 17, 1936, Serial No. 96,554

7 Claims. (Cl. 260—156)

This invention relates to the removal of mercaptans from solutions in organic solvents which are substantially non-miscible with water, by treatment with strong aqueous alkali hydroxides. In particular, this treatment is applicable to hydrocarbon distillates.

Substantially complete extraction of mercaptans having several carbon atoms from solutions in practically neutral hydrophobe organic solvents with aqueous alkali hydroxide has heretofore been considered impractical. The term, practically neutral hydrophobe organic liquids, as herein used, refers to neutral or slightly alkaline liquid organic substances which are non-miscible with water at treating temperatures, such as petroleum hydrocarbons, preferably those boiling below about 350° C., for instance, liquid hydrocarbons, such as gasoline, kerosene, light gas oils; benzene, toluene, xylene; chlorinated hydrocarbons of which chlorethane, ethylene di-chloride, trichlorethylene, carbon tetrachloride, chlorpropane, chlorbutane, chlorbenzol, brombenzol, are examples; pyridine, petroleum bases, etc. Whereas the lower mercaptans of three or less carbon atoms can be removed to a sufficient extent by such treatment to make substantially complete removal by multi-stage countercurrent treatment feasible, mercaptans of five and more carbon atoms have heretofore been considered practically unextractable by such means, unless excessively large quantities of alkali hydroxide are used. This behavior was usually explained by the assumption that mercaptans are exceedingly weak acids, and that their acidity or ionization constant decreases with the lengthening of the carbon chain. Because of the presumed low acidity of mercaptans, it was believed that water in the alkali hydroxide causes hydrolysis of the heavier mercaptides and thus prevents an effective transfer of the mercaptans from the organic solution to the aqueous alkli hydroxide.

To avoid hydrolysis, it has therefore been suggested to treat mercaptan solutions with substantially anhydrous alkli hydroxide, or else with molten alkali hydroxide at an elevated temperature.

We have found that the reason for the different behavior of various mercaptans toward aqueous alkali hydroxide is caused not so much by differences of their acidities as heretofore had been assumed, but by differences in the solubilities of unneutralized mercaptans in water or aqueous alkali hydroxide, which solubilities decrease with lengthening and branching of the carbon chain. For instance, we have found that ethyl mercaptan is approximately 80 times more soluble in water than normal amyl mercaptan.

Our improved method of removing mercaptans consists essentially of subjecting a solution of mercaptans in a hydrophobe organic solvent to a one-step treatment with a substantially saturated aqueous solution of an alkali hydroxide, which may or may not contain an excess of a solid alkali hydroxide, preferably at a temperature between about 0° C. and 60° C. As will hereinafter be explained, our method, besides effecting a more complete extraction of mercaptans than is possible with dilute aqueous or substantially anhydrous alkali hydroxide, obviates the necessity of applying multi-stage countercurrent treatment and large excesses of alkali hydroxide. Our method is particularly applicable to mercaptans boiling below about 350° C. and preferably below 300° C., mercaptans of higher boiling points having a tendency to form alkali mercaptides which are preferably wetted by hydrophobe organic liquids, thereby acting as emulsifying agents, and also are soluble in hydrophobe organic liquids to a considerable extent, so that the effectiveness of the alkali treatment is reduced.

Our invention is most easily understood when the following equilibria, which control the distribution of mercaptans between hydrophobe organic liquids and aqueous alkali hydroxide, are considered:

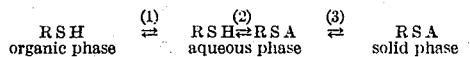

$$\underset{\text{organic phase}}{\text{RSH}} \underset{}{\overset{(1)}{\rightleftarrows}} \underset{\text{aqueous phase}}{\text{RSH} \rightleftarrows \text{RSA}} \overset{(2)}{\overset{(3)}{\rightleftarrows}} \underset{\text{solid phase}}{\text{RSA}}$$

According to the above formula, in which RSH is a mercaptan and A is an alkali metal, three main equilibria are involved, which are marked (1), (2), and (3), respectively.

Equilibrium (1) represents the distribution of unneutralized mercaptan between the organic and aqueous phases. It depends solely on the relative solubilities of the free mercaptan in the organic liquid and aqueous alkali hydroxide.

Equilibrium (2) represents the ratio of free mercaptan to alkali mercaptide in the aqueous phase. The concentration of mercaptide depends upon the concentration of the free mercaptan in the aqueous phase and the degree of hydrolysis of the mercaptide, the former as has been shown, depending on Equilibrium (1).

Equilibrium (3) between solid mercaptide and mercaptide dissolved in the aqueous phase, depends entirely on the solubility of the mercaptide in the aqueous phase.

If now the solubility of the alkali mercaptide in the aqueous phase is lowered by some artificial means to below the equilibrium concentration, mercaptides are precipitated and free mercaptan will be drawn from the organic phase into the aqueous phase to be converted to mercaptide, which may then be precipitated, until the concentration of the mercaptan in the organic phase is sufficiently lowered to establish a new equilibrium, corresponding to the solubility of the mercaptides in the aqueous phase.

We have discovered that the solubility of alkali mercaptides in substantially saturated aqueous alkali hydroxide is sufficiently low to effect conversion of mercaptans contained in hydrophobe organic liquids into solid mercaptides, in spite of a very unfavorable solubility of free mercaptans of 4 and more carbon atoms in the aqueous phase, so that in many instances the organic liquids are sweetened to the extent of passing the doctor test.

By the term "substantially saturated aqueous alkali hydroxide", as herein used, is meant alkali hydroxide containing not more than about 60% and preferably not more than about 50% water. At normal room temperature aqueous alkali hydroxides containing less than about 50% water are mixtures of solid alkali hydroxide and the saturated aqueous solution.

To demonstrate the effect of concentration of the alkali hydroxide on the removal of the mercaptans the following illustrative data are presented. A solution of .08% sulfur in the form of amyl mercaptan in di-isobutylene was treated with 20% by volume of sodium hydroxide solutions of various concentrations. Percent sulfur removed varied as follows:

| Concentration of NaOH | Amyl mercaptan removed from di-isobutylene solution |
|---|---|
| Percent | Percent |
| 10 | 19 |
| 20 | 17 |
| 30 | 11 |
| 40 | 75 |
| 50 | 96 |

It will be noted from the above figures that the percent mercaptan removed from the solution decreases with increasing alkali concentration up to a concentration of about 30% and then sharply increases. This anomaly appears to exist for all mercaptans of more than 2 carbon atoms boiling below about 350° C. and was found to be due to a decline of solubility of the free mercaptans in the aqueous alkali hydroxide, which adversely affects the equilibrium concentration of the mercaptides as hereinbefore explained. At about 40% alkali concentration, precipitation of mercaptides begins and the effect of the decline in solubility of free mercaptans in the aqueous phase is thereby counteracted.

Since the solubility of free mercaptans continues to decline with increasing alkali content, it reaches its lowest point in anhydrous alkali hydroxide. This has the effect of making anhydrous alkali hydroxide a treating agent for mercaptans which is inferior to one containing at least a small amount of water. We have found that in order to be useful for our process, an alkali hydroxide must contain at least about 2% water. The effect of a small amount of water on the efficiency of mercaptan removal is well demonstrated by the following example:

When treating a solution of tertiary butyl mercaptan in di-isobutylene containing .0735% mercaptan sulfur with anhydrous sodium hydroxide, the sulfur content was reduced to .0351%, whereas a treatment with the same amount of sodium hydroxide containing 2% water reduced the sulfur content to .0021%.

The optimum water content of alkali hydroxide which results in a maximum removal of mercaptans varies considerably for various mercaptans and organic solvents. Thus, a West Texas straight run gasoline is most effectively demercaptanized with caustic containing about 15 to 25% water, while a cracked gasoline from the same crude oil is little sensitive to changes in the water content of the alkali within the limits of 2 to about 50%.

The extraction efficiency is for all practical purposes independent of the amount of aqueous alkali hydroxide used for the extraction, as long as the aqueous phase contains enough alkali to convert substantially all of the mercaptans in the organic solution to solid mercaptides and leave behind an aqueous phase which contains at least 40%, and preferably 50%, alkali hydroxide. In accordance with the aforementioned equilibria as long as precipitated mercaptides are present, an amount of alkali hydroxide greater than the minimum amount cannot draw further quantities of mercaptans from the organic solution except a trace which is soluble as free mercaptans in the excess hydroxide. For the same reason, subsequent extractions with saturated alkali hydroxide fail to reduce materially the mercaptan content below that which is obtained in the first extraction.

The temperature of extraction has some influence on the extraction efficiency, the efficiency normally decreasing with increasing temperatures. For this reason and also because of the danger of oxidation of mercaptans to disulfides in the presence of air or oxygen, which prevents the reduction of the total sulfur content, we prefer to carry out our treatment below about 60° C. and preferably at ordinary room temperatures or slightly below. The following table indicates the effect of the temperature on the extraction of various mercaptans with sodium hydroxide containing about 25% water.

| Mercaptan | Solvent | Percent mercaptan left after treatment at | | |
|---|---|---|---|---|
| | | 0° C. | 20° C. | 60° C. |
| N-propyl | Di-isobutylene | .0005 | .0014 | |
| Tert. butyl | Toluene | .0006 | .0027 | |
| N-heptyl | Toluene | .0004 | .0019 | |
| Iso-octyl | Di-isobutylene | .0183 | .0167 | |
| Mixed | Sour West Texas cracked gasoline | .0053 | .0050 | .0085 |

The West Texas cracked gasoline in the above table had an original mercaptan sulfur content of .107%. At 0° C. and 20° C., .102% mercaptan sulfur, or about 97% of the total, was actually removed, no oxidation having taken place by air entrained in the treating system. At 60° C., however, .051% of the mercaptan sulfur was oxidized to disulfide sulfur, only .047% mercaptan sulfur or 44% of the total having actually been removed.

Since disulfides lower the knock rating and lead susceptibility of gasolines we prefer to carry out the extraction under conditions substantially to avoid the formation of disulfides.

Differences between the extraction efficiencies of various alkali hydroxides, while existing, are of minor importance. The general rule is that the efficiency rises with increasing molecular weight of the alkali metal. For practical purposes, sodium and potassium hydroxide need be considered only, potassium being slightly more effective. Because of the lower cost of the sodium hydroxide, however, we usually prefer to use the latter.

It is understood that this process is concerned with the removal of mercaptans, which may be accompanied by the removal of other acidic substances when these are present in the organic solution being treated, and involves the use of caustic alkali as the only active chemical reagent in the absence of any other chemically active substances which promote or cause reactions other than those resulting in the formation of alkali mercaptides.

We claim as our invention:

1. In the process of separating mercaptans from a solution in a hydrophobe substantially neutral organic solvent, the step of treating said solution with an aqueous substantially saturated alkali metal hydroxide at a temperature not exceeding 60° C. under conditions to avoid conversion of the mercaptans to disulfides and to form three phases, a treated organic solvent phase, an aqueous alkali hydroxide phase and an alkali mercaptide phase, and separating the treated organic solvent phase from the remaining phases.

2. The process of claim 1 in which the saturated alkali metal hydroxide contains an excess of solid alkali hydroxide.

3. The process of claim 1 in which the aqueous alkali metal hydroxide contains not more than 60% water.

4. The process of claim 1 in which the aqueous alkali metal hydroxide contains between 2 and 50% water.

5. The process of claim 1 in which the alkali metal hydroxide is sodium hydroxide.

6. The process of claim 1 in which the alkali metal hydroxide is potassium hydroxide.

7. The process of claim 1 in which the mercaptans boil below 350° C.

DAVID LOUIS YABROFF.
JOHN WILKINSON GIVENS.